United States Patent
Fogelholm et al.

(10) Patent No.: US 6,457,039 B1
(45) Date of Patent: Sep. 24, 2002

(54) METHOD AND APPARATUS FOR AVOIDING IP-ADDRESS COLLISION WHEN CONNECTING AN INCOMING VOICE PHONE CALL TO AN INTERNET APPLICATION

(75) Inventors: Rabbe Fogelholm, Sollentuna (SE); Johan Svedberg, Stockholm (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/301,103

(22) Filed: Apr. 28, 1999

Related U.S. Application Data

(63) Continuation of application No. PCT/SE97/01797, filed on Oct. 28, 1997.

(30) Foreign Application Priority Data

Oct. 28, 1996 (SE) ................................................ 9603932

(51) Int. Cl.$^7$ ................................................ G06F 15/16
(52) U.S. Cl. ................ 709/200; 709/206; 709/225; 709/227; 709/238; 709/245; 370/389; 379/89; 379/90.01; 379/92.04; 379/93.01
(58) Field of Search ................ 709/200, 201, 709/203, 217, 218, 219, 222, 225, 206, 223, 228, 245, 227, 238, 232; 370/389; 379/88, 89, 90.01, 92.04, 93.01

(56) References Cited

U.S. PATENT DOCUMENTS

| 5,530,809 | A | * | 6/1996 | Douglas et al. ............. 709/220 |
| 5,845,070 | A | * | 12/1998 | Ikudome |
| 5,987,611 | A | * | 11/1999 | Freund |
| 6,243,749 | B1 | * | 6/2001 | Sitaraman et al. .......... 709/217 |
| 6,310,889 | B1 | * | 10/2001 | Parsons et al. ............. 370/466 |

FOREIGN PATENT DOCUMENTS

| JP | 236320 | * 8/2001 |
| SE | 506 775 | 4/1996 |
| WO | 95/27942 | 10/1995 |
| WO | 96/20553 | 7/1996 |

* cited by examiner

Primary Examiner—Ario Etienne
(74) Attorney, Agent, or Firm—Burns, Doane, Swecker & Mathis, L.L.P.

(57) ABSTRACT

A method and an apparatus solve the problem of how to avoid IP-address collision when connecting an incoming voice phone call to an internet application. The problem is solved by, from time to time, for each entry in the list, sending a message to an application located on the IP-address and, depending on the answer or the lack of an answer, updating the list.

11 Claims, 5 Drawing Sheets

METHOD AND APPARATUS FOR AVOIDING IP-ADDRESS COLLISION WHEN CONNECTING AN INCOMING VOICE PHONE CALL TO AN INTERNET APPLICATION

This application is a continuation of International Application No. PCT/SE97/01797 filed on Oct. 28. 1997, which designates the United States.

BACKGROUND

The present invention relates to Internet and telecommunication in general and to maintaining an accurate association between A-numbers and IP-addresses in particular.

A telephone user, hereafter called a subscriber, may, by using a modem, connect to an ISP (Internet Service Provider) and thus get access to the Internet through his regular voice telephone. The drawback is that while the subscriber is using his Internet account ("surfing") his phone is busy and therefore anyone dialing the subscriber will get a busy-tone. This can be solved as described in the Swedish application SE-9602212-4 by forwarding calls to the subscriber to a voice gateway. The voice gateway handles the translation between voice and the Internet and the subscriber will receive a message indicating a waiting voice call and can connect to the calling party using state-of-the-art voice-over-IP technology. This way the subscriber may simultaneously be connected to the Internet and use his voice phone.

The subscriber may also place an outgoing call through the voice gateway in a similar manner. For a deeper description of the above mentioned ideas please refer to SE-9602212-4.

To be able to direct voice calls coming to the voice gateway to the right destination it is vital to maintain an accurate list of the relation between a-number and IP-addresses. This issue is not solved in the related art.

SUMMARY

The present invention discloses a method and an apparatus for solving the problem with how to avoid IP-address collision when connection an incoming voice phone call to an internet application.

The purpose of the present invention is to be able to avoid IP-address collision and to be able to maintain an accurate reference list with IP-addresses and phone numbers.

The problem, described above, regarding how to avoid IP-address collision and to maintain an accurate IP-address and A-number list is solved by from time to time, for each entry in the list, send a message to an application located on the IP-address and depending on the answer or the lack of an answer update the list.

DETAILED DESCRIPTION OF PREFERRED EMBODIMENTS

In the following description, for purposes of explanation and not limitation, specific details are set forth, in order to provide a thorough understanding of the present invention. However, it will be apparent to one skilled in the art that the present invention may be practised in other embodiments that depart from these specific details In other instances, detailed descriptions of well known methods, devices, and circuits are omitted so as not to obscure the description of the present invention with unnecessary detail.

Figure 1:
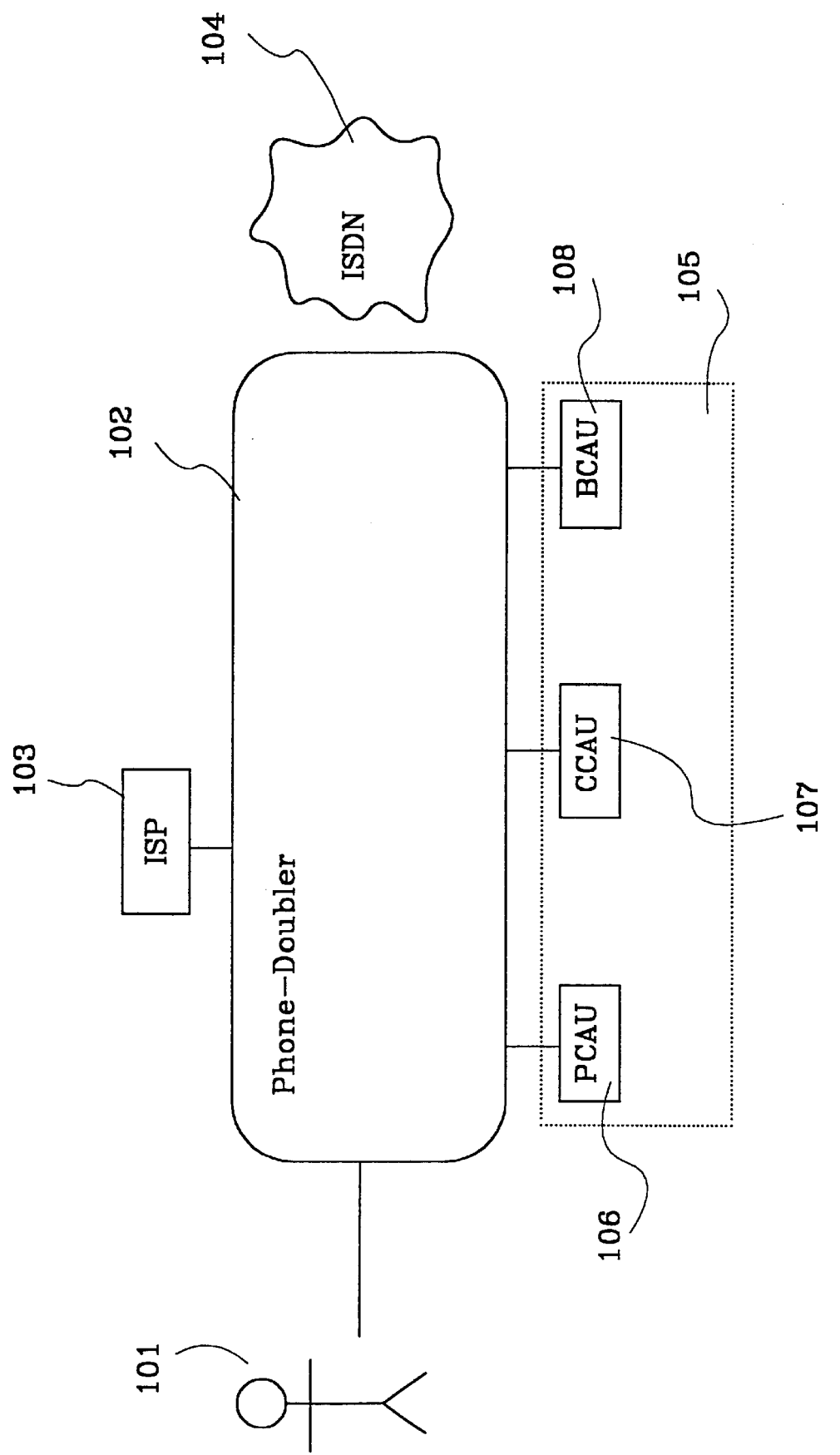
FIG. 1 shows in overview a logical network model.

FIG. 1 shows a general overview of the surroundings of the network and how the phone-doubler interfaces with its neighbors. A user 101 is connected to the phone-doubler 102. The phone-doubler 102 is also connected to the ISP 103, to the ISDN (Integrated Services Digital Network) 104 and to ISP-adaptations 105. Such adaptations could for instance be a PCAU (PSTN Control Adaption Unit) 106. The PCAU 106 is a unit that mediates between phone-doubler 102 and the network operator's PSTN network, for the purpose of activation and deactivation of call diversions. Call diversion is an integral part of the workings of the phone-doubler. Another adaption unit can be a CCAU (Customer Care Adaption Unit) 108, which is a unit that mediates between phone-doubler 102 and the customer care system of the ISP. The last adaptation unit shown in FIG. 1 is the BCAU (Billing Centre Adaptation Unit) 108, which is a unit that mediates between phone-doubler 102 and the billing centre of the ISP.

Figure 2:
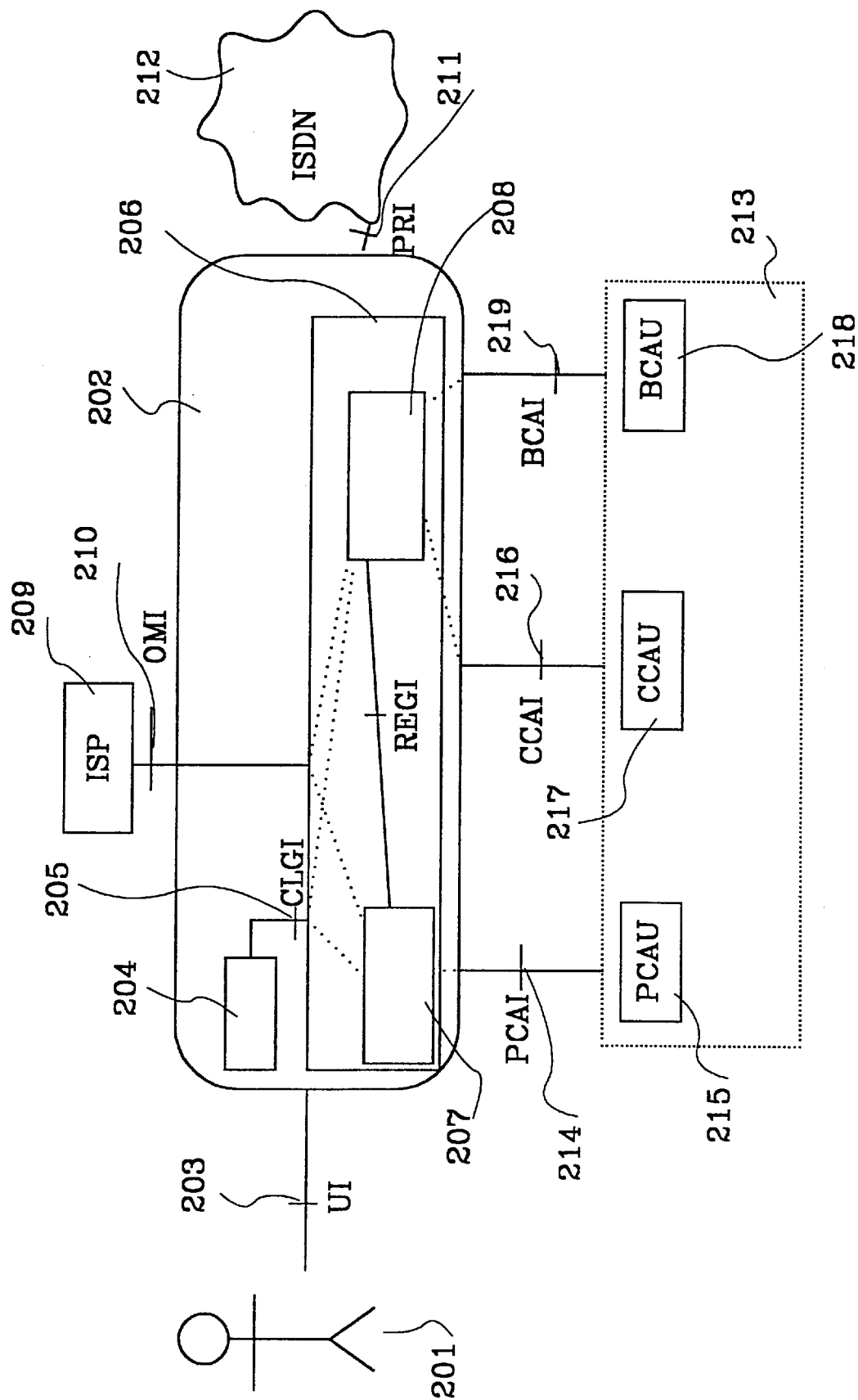
FIG. 2 shows in more detail the phone-doubler and its interfaces.

In FIG. 2 a more detailed description of the inner working of the phone-doubler and its interfaces is shown. The user 201 is still present and is utilising the phone-doubler 202 through an UI (User Interface) 203. The UI could for instance be a Microsoft Windows application giving the user a windows user interface for handling the phone-doubler services. The user is using a client software 204 which could be the just mentioned windows application handling the communication with the gateway 206 over a CLGI (Client Gateway Interface) 205. The gateway 206 is located on the ISP 209 premises. The gateway 206 can be located at different geographical locations. The gateway 206 comprises a gateway registry 207 which is common to all subscribers to the phone-doubler services, and at least one VGWM (Voice GateWay Module) 208. The VGWM 208 processes the call and speech transmissions and can handle several calls simultaneous.

The ISP has for operation and maintenance a OMI (Operation and Maintenance Interface) 210 to the phone-doubler 202. An PRI (Primary Rate Interface) 211 connects the phone-doubler 202 with the ISDN 212.

For communication between the phone-doubler 202 and the ISP-adaptations 213 a number of different interfaces are used. PCAI (PSTN Control Adaptation Interface) 214 for communication with PCAU 215, CCAI (Customer Care Adaptation Interface) 216 for communication with CCAU 217 and BCAI (Billing Centre Adaptation Interface) for communication with BCAU 218.

Figure 3:
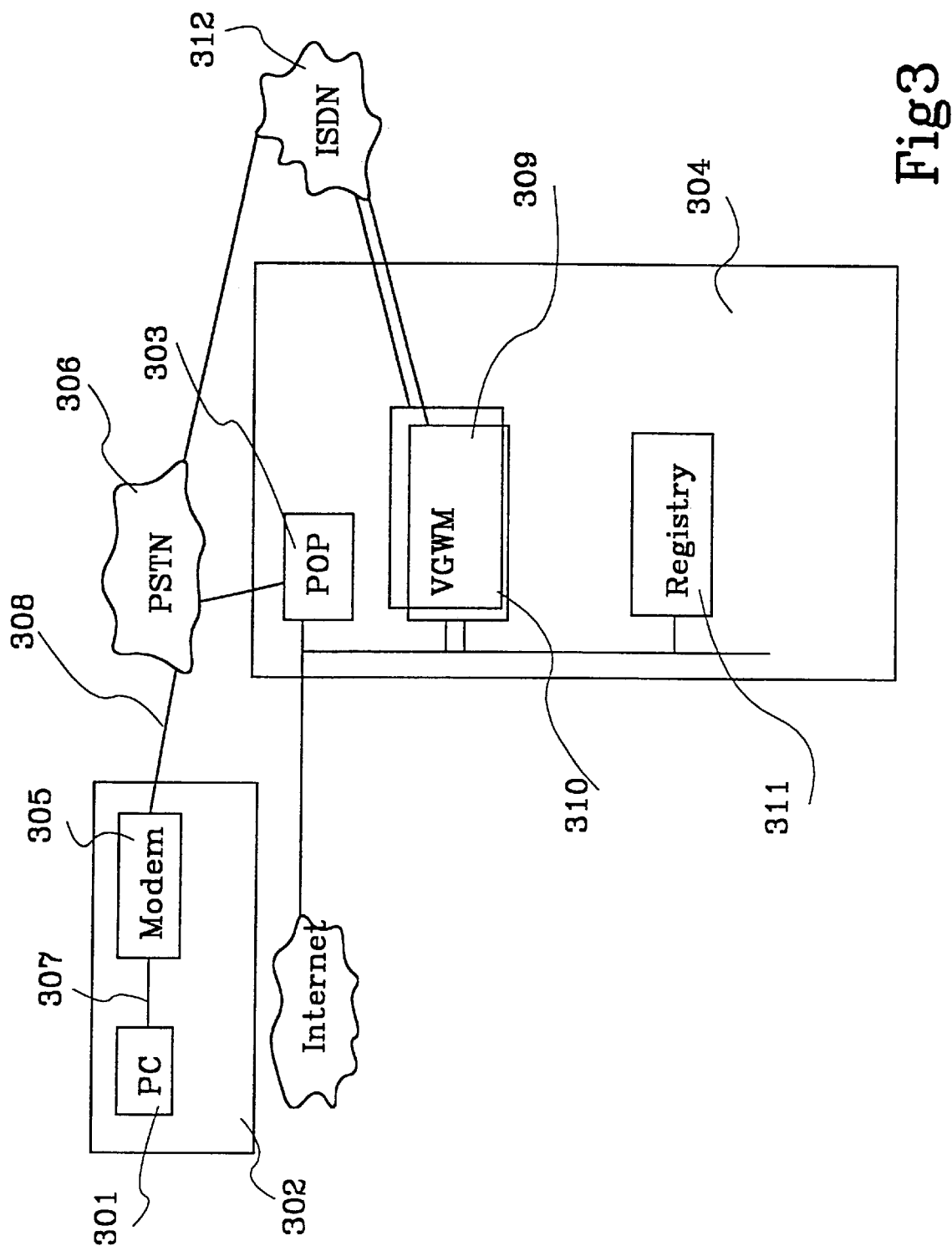
FIG. 3 displays a physical network model.

The client 204 is running on a PC (Personal Computer) 301 in FIG. 3, located at the users premises 302 and connected to the ISP's POP (Point Of Presence) 303, at the ISP's premises 304 via a modem 305 and PSTN 306. The PC 301 is given an IP-address 307 by the ISP. This is normally done dynamically when connecting to the POP 303. The users normal telephone line 308 is used for connecting between the modem 305 and the PSTN 306.

One or several VGWM 309 is connected to the ISP's IP network 310, typically on the same switched Ethernet as the POP but not necessarily. Each VGWM 309 has its own IP-address, and the registry 311 may have an IP-address of its own, or share the IP-address of one of the VGWM's 309.

Each VGWM 309 is connected to ISDN 312 via PRI.

One registry node 311 can handle several VGWM 309. The registry node 311 can physically be remotely placed. An ISP can have one central registry node 311 and several distributed VGWM 309.

The client 204 in FIG. 2 stores a number of different data items such as:

Country code

Area code (including trunk prefix)

Telephone number (local number)

Service preferences client IP address (volatile)

Hostname of registry

VGWM IP address (volatile)

ISDN number to VGWM cluster (this may be a group number)

Reject incoming calls (volatile, settable from the GUI)

The combination of country code, area code, and local number identifies each subscriber uniquely.

The VGWM IP address attribute also represents the state of the client: A null address indicates that the client is signed-off from the phone-doubler service, any other address indicates that the client is signed-on.

The registry 311 holds a subscriber record for each client, where each record comprises the following attributes:

telephone number (key, persistent, made up from country code, area code, and local number)

password (persistent, stored with a one-way function encryption)

client IP address (secondary key, volatile)

user id (persistent)

service preferences (persistent)

number of sign-on (persistent)

number of incoming calls (persistent)

number of outgoing calls (persistent)

first sign-on (persistent)

last sign-on (persistent)

The client IP address attribute also represents the state of the subscriber record, a null IP address states that the client 204 is signed-off, any other address states that the client 204 is signed-on.

When a user 201 is connected to the Internet, the IP address of the client 307 is entered into the subscriber record. Since both the telephone number and this IP address are keys, an PSTN-to-IP association between the telephone number and IP address is maintained in the subscriber record.

Whenever an event occurs in the phone-doubler service relating to the registry, a record is created in the registry 311 and stored in the registry log. The registry log contains records of events, relating to the session that takes place between a sign-on and a sign-off. A registry log record is created when a subscriber record changes state to signed-off, or when a subscriber record is deleted. The registry log record comprises the following attributes:

Record id (sequence number)

Termination date (timestamp of session termination)

Client IP address user id

User's telephone number

Sign-on date

Duration

Number of incoming calls

Number of outgoing calls

Termination code (indicating which normal event or exception that terminated the session)

The phone-doubler can have one or several VGWM's. Each of these VGWM's holds a record of each call or call attempt made through that particular VGWM. The call record may comprise the following attributes:

Record id (per-VGWM sequence number)

Date and time (timestamp of the completed log record)

Client IP address and port

User's telephone number

Direction (incoming or outgoing)

VGWM IP address and port

VGWM ISDN number

B-number (same as user's telephone number for incoming call)

Call set-up date and time

Duration

Sent packages

Received packages

Answer state. Answered, rejected or not answered

Termination reason. User, client, ISDN or VGWM.

Figure 4:
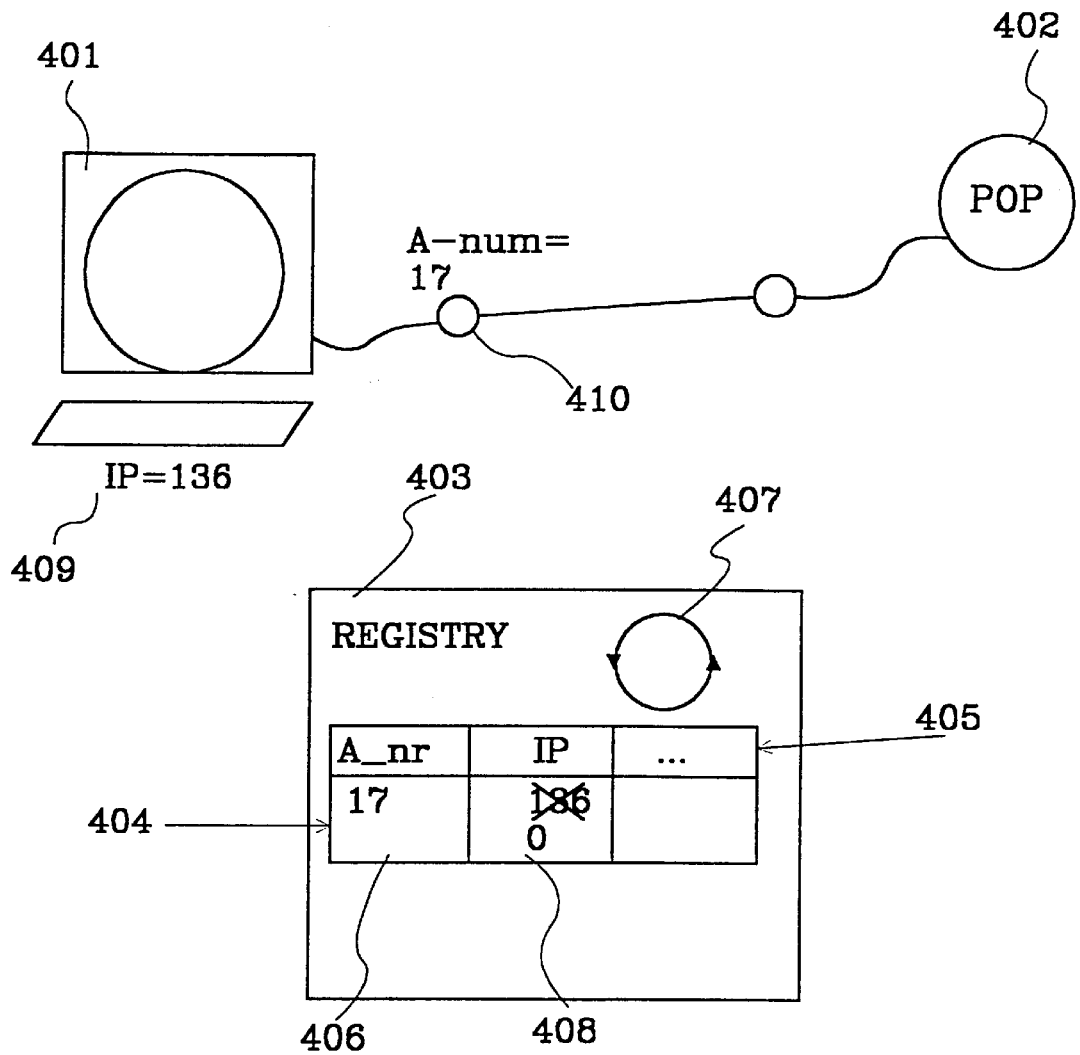
FIG. 4 shows an overview of a preferred embodiment according to the invention.

In FIG. 4 a user is denoted with 401. The user 401 has been connected to the ISP's POP 402 and been assigned an IP-address 409. The user has also, during his internet session, signed-on to the phone-doubler service and in a registry 403, a record 404, in a table 405 has been created comprising at least the users assigned IP-address 409 and the A-number of the telephone line 410 used by the user 401 to connect to the internet. For some reason the user 401 has been disconnected form the ISP in a non standard way, leaving the record 404 unchanged. Since the record 404 is used to determine if a user is signed-on or not, it is important to have the table 405 correctly reflecting the current situation. If the IP-address of an user 401 is non-null the user 401 is regarded as signed-on.

Previously, if the user 401 would try to sign-on again, the registry 403 would look into the table 405, find that the A-number in the table 406 already has an IP-address 408 and therefore must already be signed-on. The registry 403 would then refuse the user 401 admittance to the phone-doubler service. This is not the case, however, any longer, with the present invention.

An auto-control function 407, located to the registry 403, is responsible for finding, and deleting faulty records. This auto-control function 407 executes, without manual intervention, periodically. The period for execution of the auto-control function 407 is reasonably short, so that a user 401 do not have to wait too long to be able to sign-on again. However, the period must be longer than the PPP inactivity time-out parameter.

The auto-control function 407 controls each record 404 in the registry 403. If the state of the user 401 is signed-on, that is, if the IP-address 408 is non-null the auto-control function 407 connects to the user 401 to check if it is active. If the user 401 responds no further action is taken and the auto-control function 408 proceeds with the next record 404 in the table. If the user 401 is not active the auto-control function 407 will break the association between the A-number 406 of the user 401 and the IP-address 408 by setting the IP-address 408 to null. The registry logging function will also be updated.

If the user 401 is active but its A-number 401 does not match the A-number attribute 406 in the subscriber record the auto-control function 407 will issue an alarm and force the user indicated by the subscriber record to sign-off.

Figure 5:
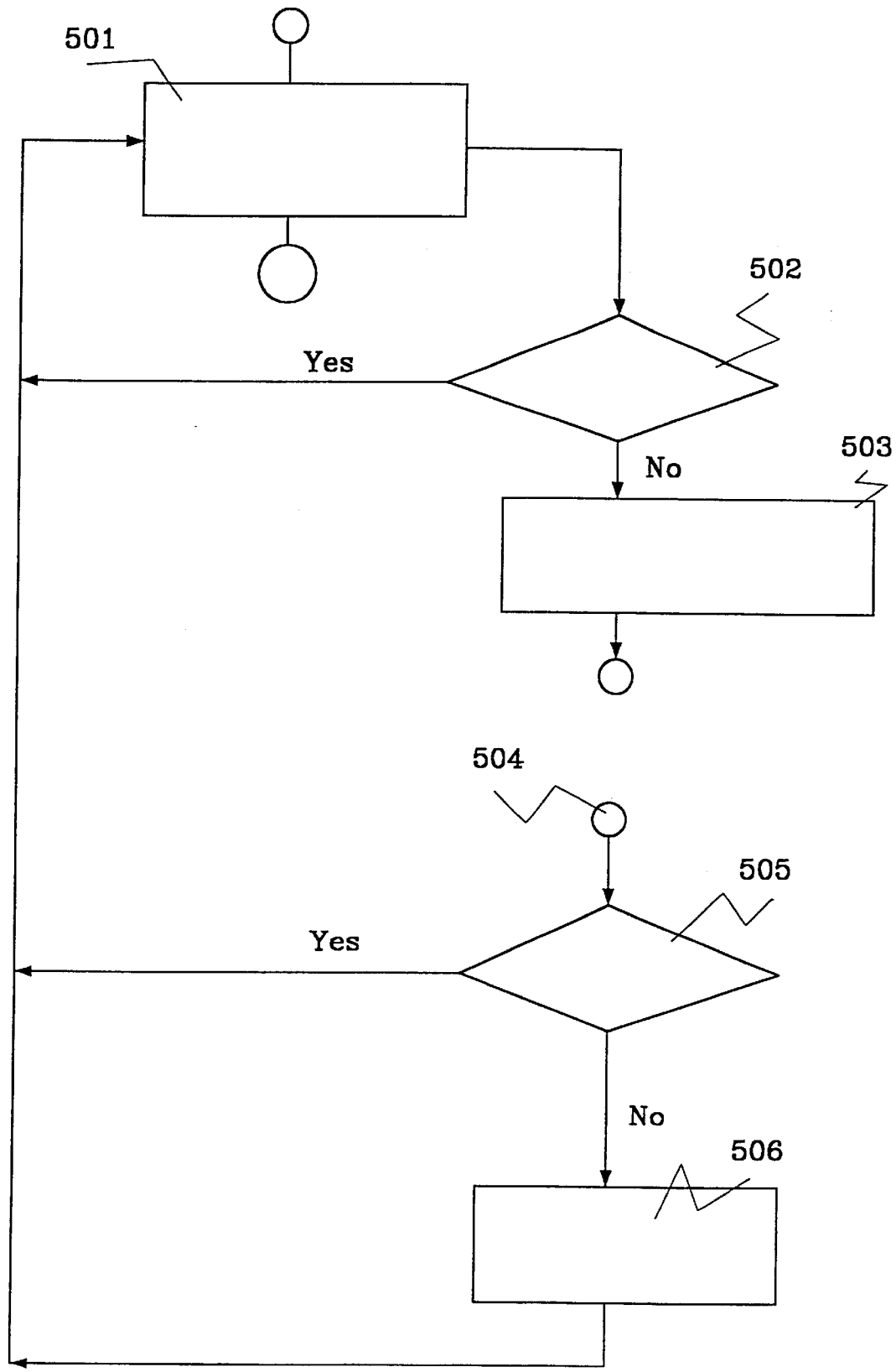
FIG. 5 shows an flowchart of a preferred embodiment according to the invention.

FIG. 5 shows a flow chart of the auto-control function. A loop 501 starts from zero and goes through all k records in the table 405. In 502 a test is performed to see if the IP-address of the current record is zero. If so the next record in the table is handled. If not a message is sent in block 503 to the IP-address of the current record and the auto-control function waits for a message. Depending on the design of the auto-control function it can either halt execution while waiting an for answer or continue to send messages to a number of different IP-addresses and handling each answer as they come. In this embodiment, for ease of understanding the auto-control function waits for an answer. In block 504 the auto-control function receives an answer. In 505 an authentication check is performed to verify that the IP-address matches the A-number stored. If the verification is okay the next record in the table is handled. If on the other hand the message received indicates a mismatch between the IP-address and the A-number the IP-address of the current record is set to zero in block 506.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a network comprising a subscriber device and a phone doubler having a table, a method for altering a record in said table, wherein said record includes at least a stored subscriber number and a stored IP-address associated with said subscriber device, the method comprising the steps of:

sending a first message to the IP-address stored in said record;

waiting for a second message sent from said IP-address in response to said first message; and if said second message is not received within a specific time interval, then setting the IP-address stored in said record to a value indicating that the subscriber device is inactive.

2. The method according to claim 1, further comprising the steps of:

if said second message is received within the specific time interval, then comparing a second subscriber number included in said second message with the subscriber number stored in said record; and if said second subscriber number and the subscriber number stored in the record do not match, then setting the IP-address stored in the record to a value indicating that the subscriber device is inactive.

3. The method according to claim 2, further comprising the step of:

signaling an alarm when said second subscriber number and the subscriber number stored in the record do not match.

4. The method according to claim 1, wherein said table comprises at least two records, each record including at least a stored subscriber number and a stored IP-address associated with a respective subscriber device; and said steps of sending a first message and waiting are performed repeatedly for the at least two records.

5. The method according to claim 4, wherein said steps of sending a first message and waiting are performed repeatedly for the at least two records within the specific time interval.

6. In a network comprising a subscriber device and a phone doubler having a table, an apparatus for altering a record in said table, the record including at least a stored subscriber number and a stored IP-address associated with said subscriber device, the apparatus comprising:

means for sending a first message to said IP-address;

means for receiving a second message from said IP-address, said second message being sent in response to said first message;

means for determining whether the second message has been received from said IP-address; and means for altering said record in response to whether the second message has been received from said IP-address.

7. The apparatus of claim 6, wherein said means for altering said record comprises means for setting the IP-address stored in said record to a value indicating that the subscriber device is inactive when no second message is received by the means for receiving within a specific time interval.

8. The apparatus according to claim 6, further comprising:

means for comparing a second subscriber number included in the second message with the subscriber number stored in the record; and included in said means for altering, means for setting the IP-address stored in the record to a value indicating that the subscriber device is inactive when the second subscriber number and the subscriber number stored in the record do not match.

9. The apparatus according to claim 8, further comprising means for signaling an alarm when said second subscriber number and the subscriber number stored in the record do not match.

10. The apparatus according to claim 6, wherein the table comprises at least two records, each record including at least a stored subscriber number and a stored IP-address associated with a respective subscriber device, and said means for sending repeatedly sends a first message to a respective IP-address stored in the at least two records and said means for determining repeatedly determines whether the second message has been received from a respective IP-address stored in the at least two records.

11. In a network comprising a subscriber device and a phone doubler having a table, a method for verifying a record in said table, wherein said record includes at least a stored subscriber number and a stored IP-address associated with said subscriber device, the method comprising the steps of:

sending a first message to the IP-address stored in said record;

determining if a second message, sent from said IP-address in response to said first message, has been received, said second message comprising a second subscriber number; and if said second message has been received, then comparing said second subscriber number with the subscriber number stored in said record.

* * * * *